(12) United States Patent
Whitney, Jr. et al.

(10) Patent No.: US 6,833,339 B2
(45) Date of Patent: Dec. 21, 2004

(54) NON-PLATED ALUMINUM BASED BEARING ALLOY WITH PERFORMANCE-ENHANCED INTERLAYER

(75) Inventors: Warren J. Whitney, Jr., Ypsilanti, MI (US); Jeffrey C. Hunter, Ann Arbor, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/408,186

(22) Filed: Apr. 4, 2003

(65) Prior Publication Data

US 2003/0207769 A1 Nov. 6, 2003

Related U.S. Application Data

(63) Continuation-in-part of application No. 09/993,227, filed on Nov. 14, 2001, now Pat. No. 6,596,671.
(60) Provisional application No. 60/248,931, filed on Nov. 15, 2000.

(51) Int. Cl.[7] .......................... B32B 15/00; C22C 21/00; F16C 33/02
(52) U.S. Cl. ........................ 508/103; 428/654; 420/528; 29/898.12; 29/898.13
(58) Field of Search ........................ 508/103; 428/654; 420/528, 548; 384/912; 29/898.12, 898.13

(56) References Cited

U.S. PATENT DOCUMENTS

| | | |
|---|---|---|
| 3,078,563 A | 2/1963 | Gould et al. |
| 3,093,885 A | 6/1963 | Morrison et al. |
| 3,132,418 A | 5/1964 | Fulford |
| 3,268,369 A | 8/1966 | Haugen |
| 3,300,837 A | 1/1967 | Fisher et al. |
| 3,300,838 A | 1/1967 | Slater et al. |
| 3,330,836 A | 7/1967 | Slater et al. |
| 3,350,773 A | 11/1967 | Beebe, Jr. et al. |
| 3,384,950 A | 5/1968 | Ruf |
| 3,386,161 A | 6/1968 | Ruf |
| 3,652,244 A | 3/1972 | Kingsbury et al. |
| 3,997,099 A | 12/1976 | Morisaki |
| 4,526,103 A * | 7/1985 | Kubota et al. ............... 101/459 |
| 4,696,867 A | 9/1987 | Eastwood |
| 4,707,194 A | 11/1987 | Eastwood |
| 4,789,607 A | 12/1988 | Fujita et al. |
| 4,996,025 A | 2/1991 | Pratt et al. |
| 5,053,286 A | 10/1991 | Pratt et al. |
| 5,075,177 A | 12/1991 | Tanaka et al. |
| 5,112,416 A | 5/1992 | Tanaka et al. |
| 5,116,692 A * | 5/1992 | Mori et al. .................. 428/650 |
| 5,209,578 A | 5/1993 | Eastham et al. |
| 5,246,509 A | 9/1993 | Kato et al. |
| 5,365,664 A | 11/1994 | Whitney, Jr. |
| 5,384,205 A * | 1/1995 | Tanaka et al. ............... 428/643 |

(List continued on next page.)

OTHER PUBLICATIONS

New Al–Si–Sn Bearins for High Power Engines, Daido Metal Co., Ltd., 3 pages.

*Primary Examiner*—Ellen M McAvoy
(74) *Attorney, Agent, or Firm*—Howard & Howard

(57) ABSTRACT

A bi-metal aluminum bearing includes an aluminum-based bearing layer, a steel backing, and an intermediate aluminum-based layer that has a thickness of from 60 to 120 micrometers positioned between the aluminum-based bearing layer and the steel backing. The intermediate layer has a yield strength that is less than that of the aluminum-based bearing layer and is preferably of pure aluminum. The aluminum-based bearing layer has a fine microstructure which imparts a very high level of conformability while retaining good fatigue strength. The aluminum bearing layer generally includes 4% to 20% by weight lead or tin, up to 26% by weight silicon and up to 2% by weight of any of the elements magnesium, manganese, nickel, zirconium, zinc, copper, or chromium with the remainder of the bearing layer being aluminum.

10 Claims, 3 Drawing Sheets

U.S. PATENT DOCUMENTS

| | | |
|---|---|---|
| 5,434,012 A | 7/1995 | Tanaka et al. |
| 5,453,244 A | 9/1995 | Tanaka et al. |
| 5,470,666 A * | 11/1995 | Tanaka et al. ............... 428/653 |
| 5,536,587 A | 7/1996 | Whitney, Jr. |
| 5,545,489 A * | 8/1996 | Tanaka et al. ............... 428/629 |
| 5,601,371 A | 2/1997 | Koroschetz et al. |
| 5,817,397 A | 10/1998 | Kamiya et al. |
| 5,911,513 A | 6/1999 | Tsuji et al. |
| 5,912,073 A | 6/1999 | Shioda et al. |
| 5,925,471 A | 7/1999 | Eastham et al. |
| 6,194,087 B1 | 2/2001 | Huhn et al. |
| 6,221,515 B1 | 4/2001 | Ramos Junior et al. |
| 6,273,972 B1 * | 8/2001 | Andler ....................... 148/522 |
| 6,379,819 B1 * | 4/2002 | Steffens et al. ............. 428/653 |
| 6,427,904 B1 * | 8/2002 | Groll ......................... 228/265 |
| 6,596,671 B2 * | 7/2003 | Whitney et al. ............ 508/103 |

\* cited by examiner

NON-PLATED ALUMINUM BASED BEARING ALLOY WITH PERFORMANCE-ENHANCED INTERLAYER

This application is a continuation-in-part of U.S. Ser. No. 09/993,227 filed Nov. 14, 2001 now U.S. Pat. No. 6,596,671, which claims priority to U.S. Provisional application 60/248,931 filed Nov. 15, 2000.

BACKGROUND OF THE INVENTION

1. Technical Field

The present invention relates generally to multi-layer sliding bearings of the type having two or more metal layers bonded to a steel backing strip for use in journaling a shaft or the like.

2. Related Art

Sleeve or sliding bearings for use as main bearings or connecting bearings in internal combustion engines can be divided into two main categories. The categories: (1) bimetal bearings, which consist of a steel backing and a lining alloy on the inside diameter; (2) trimetal bearings, which include a third layer which is typically electro deposited over the lining alloy.

Bimetal bearings typically include an aluminum based lining material placed on the inside diameter of a bearing. This type of bearing offers advantages over trimetal bearings including low cost, good wear resistance, and excellent corrosion resistance. Among bimetal bearings, the earliest examples utilized a lining alloy of AlSn20Cu1. This alloy had the advantage of very good conformability with misaligned shafts or shafts of poor geometric shape, due to its low hardness and high tin phase content. More advanced bimetal bearing alloys had increased strength and wear resistance due to higher hardness, addition of hard particles such as silicon, and decreased amount of tin. However these alloys suffer from a decrease in conformability compared to the AlSn20Cu1 alloy.

Several factors known in the art for improving the fatigue strength and performance of bearings include: (a) inclusion of a soft phase, such as tin or lead within the alloy layer to impart seizure resistance to the lining alloy; (b) inclusion of hard particles within the aluminum alloy such as silicon to increase the wear and seizure resistance of the alloy; (c) inclusion of an interlayer between the aluminum bearing alloy and the steel backing to achieve bonding between the lining and the steel when the amount of the soft phase exceeds about 10% by weight. However, there is little prior art regarding improving the conformability of the bearing, except for decreasing hardness and increasing soft phase content, both of which have a negative effect on the bearing lining fatigue resistance.

SUMMARY OF THE INVENTION

A sliding bearing constructed according to the invention has a steel backing on which a bi-metal lining is bonded. The lining includes an aluminum-based bearing layer and an intermediate layer of aluminum-based metal disposed between the bearing layer and the steel backing. The composite bearing material exhibits a high level of conformability while retaining good fatigue strength.

The invention has the advantage of providing a bi-metal aluminum bearing with a fatigue strength at a level normally associated with conformability normally associated with AlSn20Cu1 lined bearings.

The bearing material has the further advantage of providing an aluminum-based bearing layer that has a fine microstructure and lower tin content; thereby improving the fatigue strength of a bearing produced from the composite bearing material to a level normally associated with modern Al—Sn—Si alloy lined bearings.

There is also disclosed a method of manufacturing a composite bearing including the steps of: a) casting an aluminum alloy to produce an aluminum-based bearing layer having silicon particles of less than 4 microns in average diameter dispersed uniformly therein, and a soft phase having a maximum length of 250 microns; b) cladding an aluminum-based intermediate layer material to said aluminum-based bearing layer to produce a bi-metal lining; and c) hot or cold bonding a steel backing layer to said bi-metal lining.

THE DRAWINGS

These and other features and advantages of the present invention will become more readily appreciated when considered in connection with the following detailed description and drawings, wherein.

DETAILED DESCRIPTION

Figure 3:
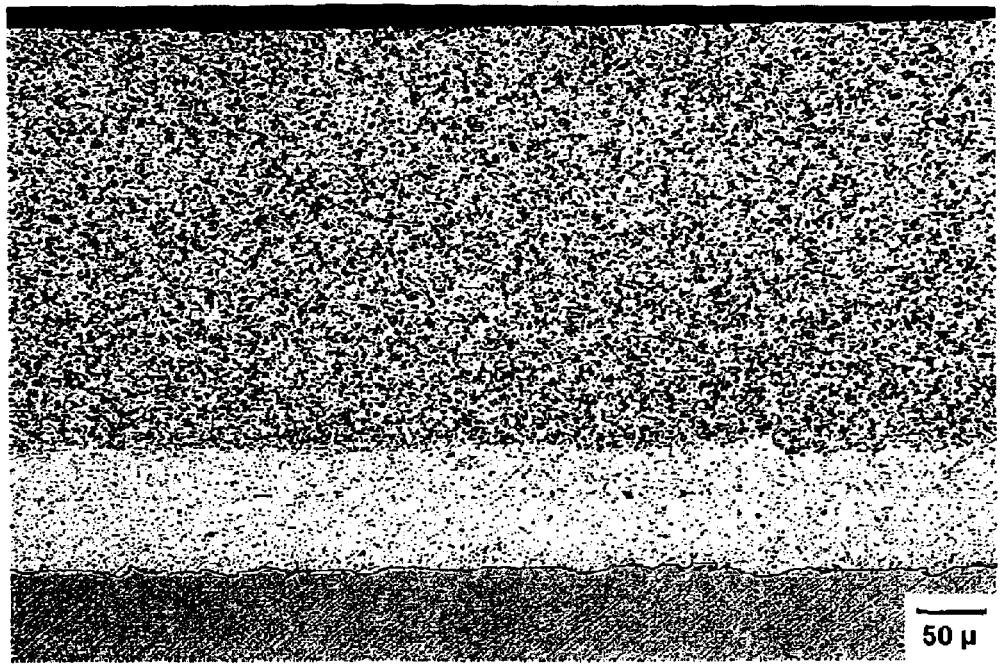
FIG. 3 is a micrograph showing the various layers of the composite bearing material of the present invention.
Figure 4:
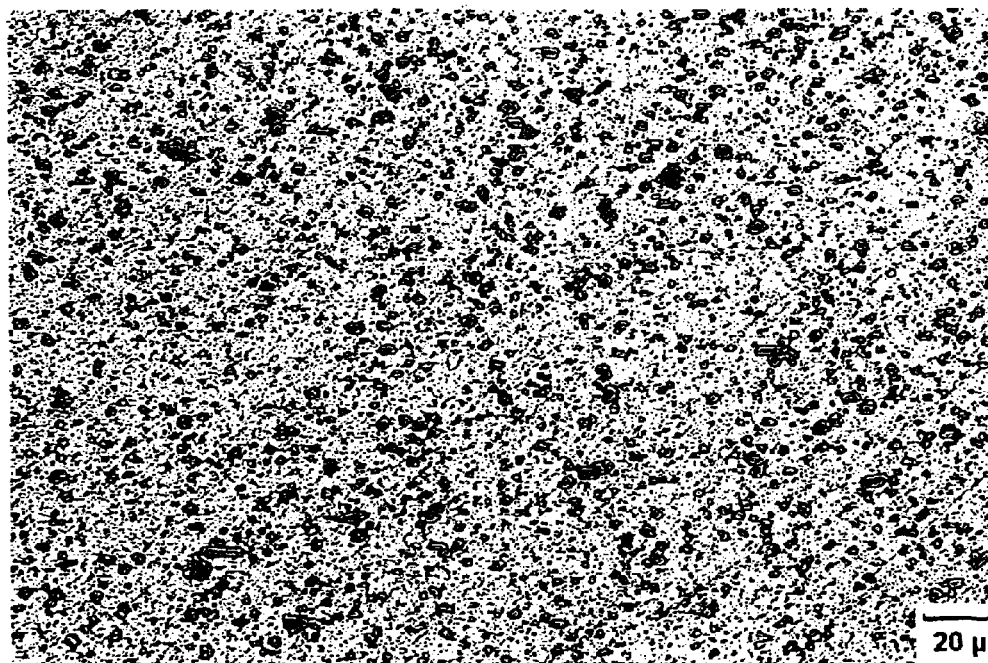
FIG. 4 is a micrograph detailing the silicon particles dispersed within the aluminum bearing alloy of the present invention.
Figure 5:
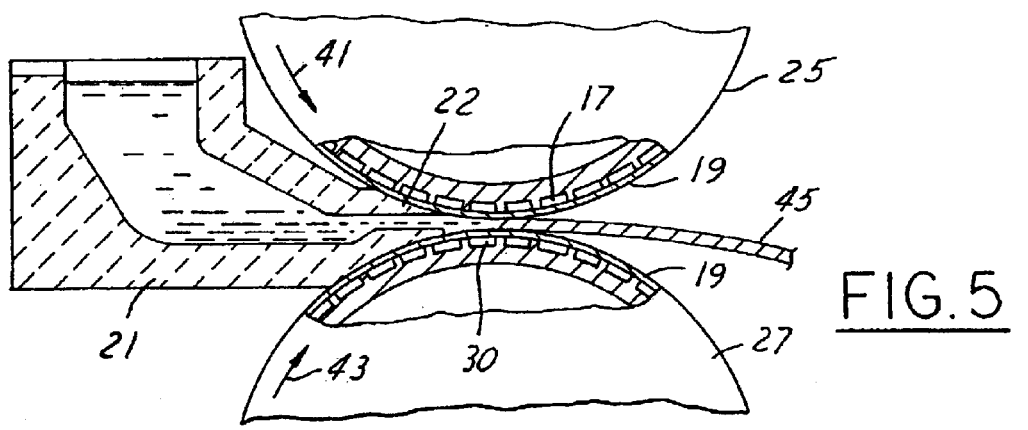
FIG. 5 is a view of an apparatus utilized to produce the aluminum bearing alloy of the present invention.

With reference to FIG. 3, there is shown a preferred embodiment of the composite bearing material 5 of the present invention. The composite bearing material 5 includes an aluminum-based bearing layer 10, a steel backing 15, and an intermediate layer 20 positioned between the aluminum layer 10 and the steel backing 15.

The aluminum-based bearing layer 10 preferably has a composition including: 4 to 20 weight percent lead or tin, 1 to 6 weight percent silicon, and up to 2 percent by weight of at least one element selected from the group consisting of manganese, magnesium, nickel, zirconium, zinc, copper, or chromium; the remainder of the aluminum bearing layer is pure aluminum. In a preferred embodiment, the aluminum-based bearing layer 10 includes 12 weight percent tin, 3 weight percent silicon, 0.5 weight percent copper, 0.2 weight percent chromium, with the remainder being aluminum.

Regardless of the exact composition of the aluminum-based bearing layer 10, the aluminum-based bearing layer 10 is characterized in that it has a fine microstructure. Aluminum materials having a fine microstructure, as well as methods of their production are disclosed in U.S. Pat. Nos. 5,536,587; 5,365,664; and 5,053,286, which are herein incorporated by reference. A fine microstructure with reference to the constituents of the aluminum-based bearing material 10 is characterized by silicon particles having an average diameter of 4 microns or less uniformly dispersed within an aluminum matrix, as well as soft phase particles of less than 250 microns in length.

In a preferred embodiment, the aluminum-based bearing layer 10 is cast in such a way which imparts a fine microstructure to the alloy.

Figure 1:
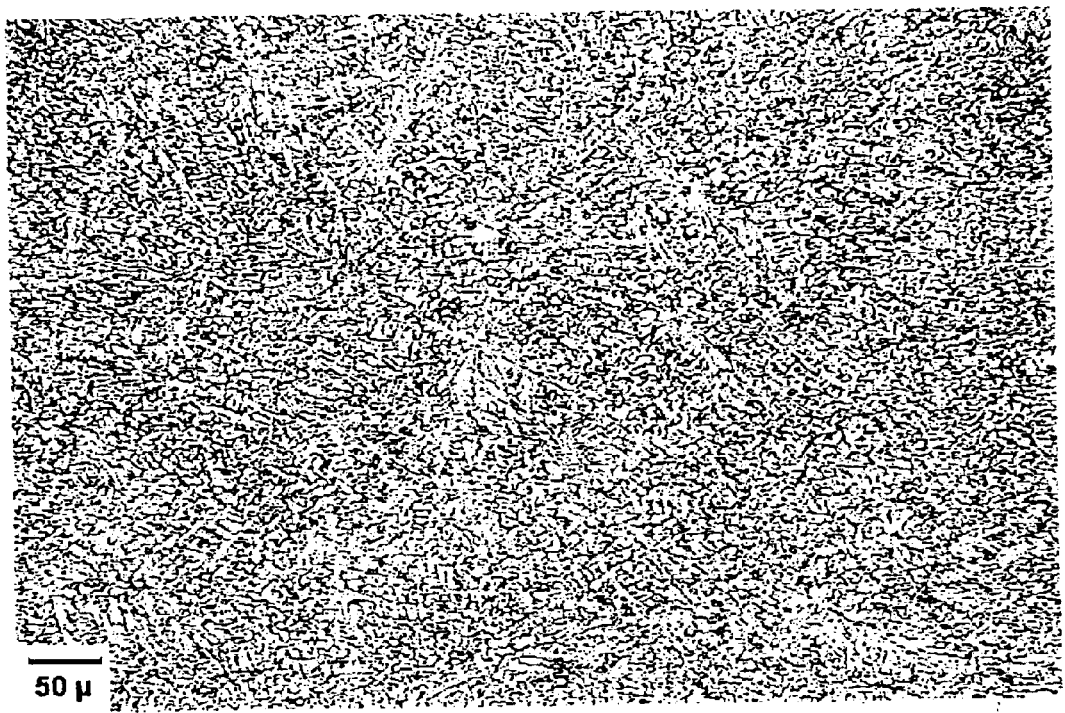
FIG. 1 is a micrograph demonstrating the fine microstructure of the aluminum bearing alloy.
Figure 2:
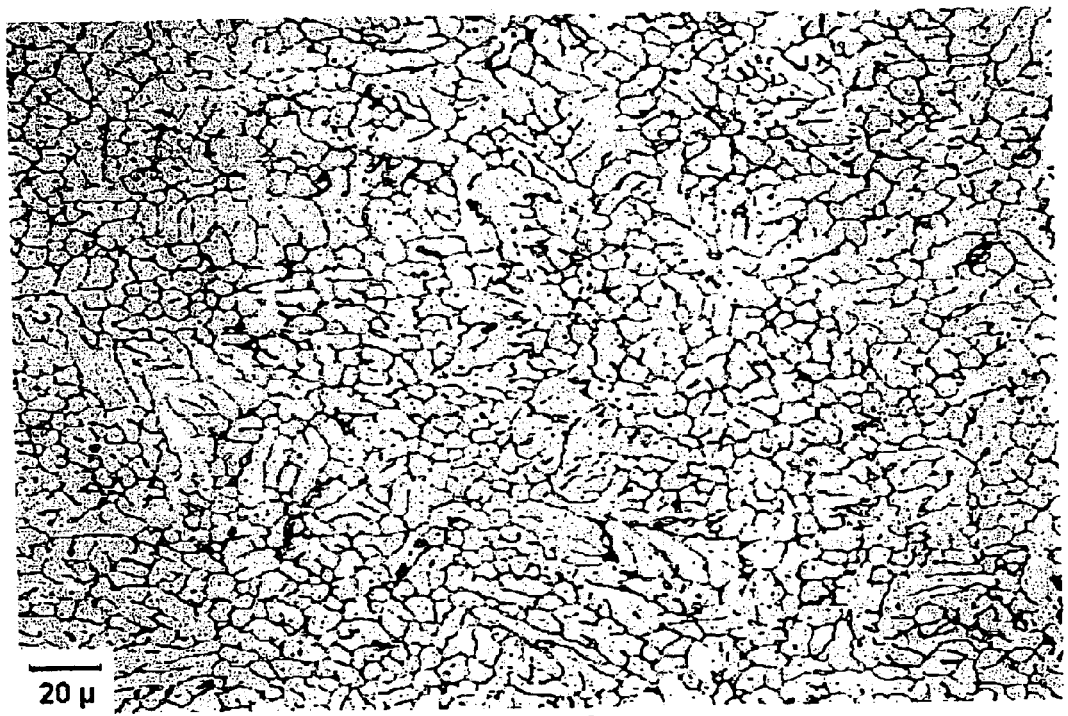
FIG. 2 is a micrograph demonstrating the fine microstructure of the aluminum bearing alloy of the present invention.

The microstructure obtained when the aluminum-based bearing layer 10 is cast with proper attention to microstructural properties is shown in FIGS. 1 and 2. The fine microstructure imparts a high strength to the aluminum-based bearing layer 10. The aluminum-based bearing layer 10 has silicon particles 12 that are dispersed within the aluminum matrix 14 and have an average size of less than 4 microns in diameter. Furthermore, the maximum length of the soft phase product particles, i.e., the lead or tin is preferably less than 250 microns in size, and even more preferably, less than about 10 microns or less in length. The fine size of the silicon and other constituents imparts a very high fatigue resistance to the aluminum-based bearing layer 10 of the present invention.

The intermediate layer 20 of the present invention is preferably a pure aluminum foil or an aluminum alloy foil that has a lower yield strength than the aluminum-based bearing layer 10. The intermediate layer 20 is sized such that it has a thickness of at least 60 micrometers and preferably between 60 and 120 micrometers after being processed.

There is also disclosed a method of manufacturing a composite bearing including the steps of: a) casting an aluminum alloy to produce an aluminum-based bearing layer having silicon particles of less than 4 microns in an average diameter dispersed uniformly therein, and a soft phase having a maximum length of 250 microns; b) cladding an aluminum-based intermediate layer material to said aluminum-based bearing layer to produce a bi-metal lining; and c) hot or cold bonding a steel backing layer to said bi-metal lining.

After the aluminum-based bearing layer 10 is cast, the intermediate layer 20 is roll clad to the aluminum bearing layer 10. The intermediate layer 20 is chosen such that its thickness in the finished product will be between 60 and 120 micrometers. As referenced above, a preferred intermediate layer 20 material includes pure aluminum or an aluminum alloy.

After the intermediate layer 20 has been clad to the aluminum-based bearing layer 10, the bi-metal lining may be hot bonded to the steel backing 15 according to the process disclosed in U.S. Pat. No. 3,078,563, which is herein incorporated by reference. In this process, the temperature of the components to be bonded is raised significantly above ambient temperature, and the aluminum-based bearing layer 10 is reduced in thickness by approximately 75 percent while the reduction in thickness of the steel backing 15 is essentially zero. Alternatively the lining may be bonded to the steel backing by a cold bonding process in which both the lining alloy and the steel are reduced in thickness approximately 40–50%.

Figure 6:
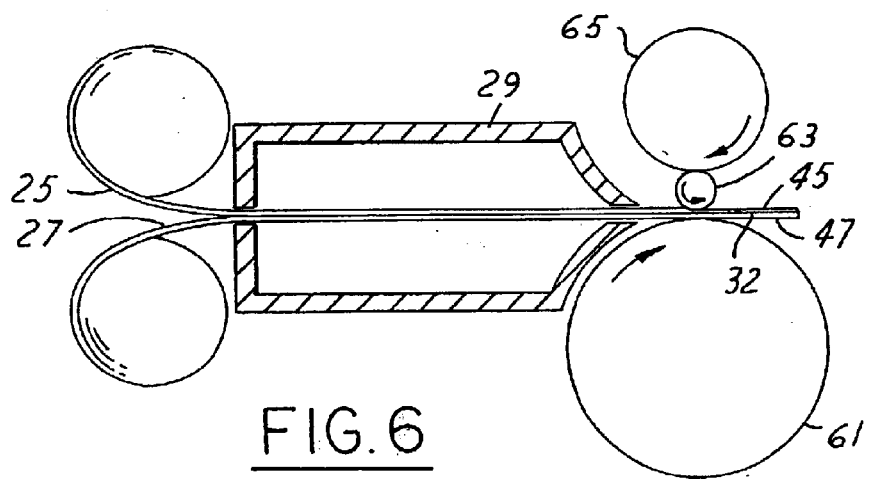
FIG. 6 is a view detailing an apparatus that is used for cladding an aluminum intermediate layer with an aluminum bearing layer of the present invention.

With reference to FIG. 6, there is shown an apparatus utilized in the hot bonding process. The bi-metal lining strip 45 is mated to a steel strip 47 and passed through a heater. Alternatively, the steel can be heated and the bi-metal strip introduced after the heater where it is heated by the steel. The materials are kept under a non-oxidizing atmosphere to protect the strips from oxidizing while it is being heated. The heated strips 45, 47 are passed through a rolling mill assembly that includes a relatively large diameter lower roll 61 and a smaller diameter center roll 63 which is backed up by a larger diameter upper roll 65. The spacing between the rolls 61 and 63 is less than the combined initial thicknesses of the strips 45, 47, such that the bi-metal strip 45 is compressed and reduced in thickness during the passage of the mating strips through the rolls. The lower roll 61 is powered to provide the force to move the strips 45, 47 through the rolls. The lower roll 61 is preferably at least two times the diameter of the center roll 63 so that the center roll 63 exerts a substantially greater force per unit area on the bi-metal strip 45 than the unit area force exerted by the lower roll 61 on the steel 47. Thus, the bi-metal strip 45 is substantially reduced in thickness whereas the thickness of the steel 47 remains essentially unchanged.

If the hot bonding process is used, because the thickness of the steel layer 47 is essentially unchanged, its hardness is not significantly increased, and the emerging composite material 5 is workable and reshapable into desired bearing configurations.

EXAMPLES

Figure 7:
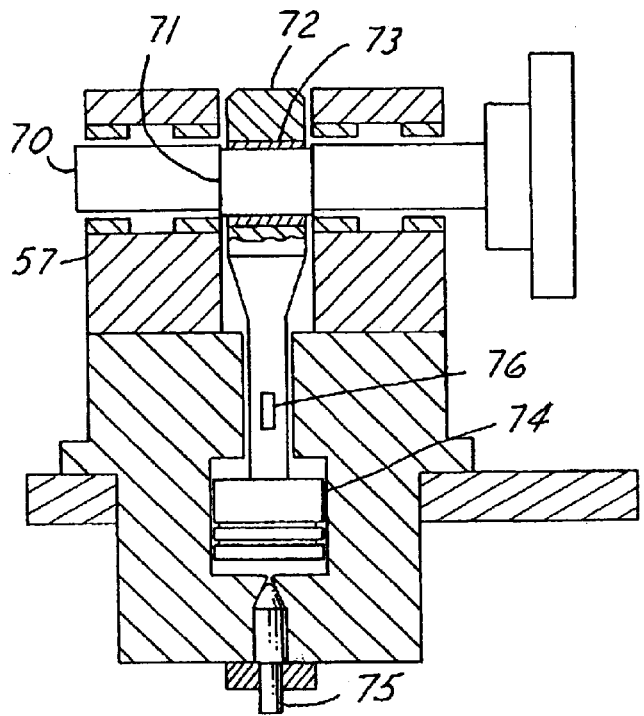
FIG. 7 is a view detailing a testing apparatus for determining the fatigue strength of a bearing.

In a bearing fatigue test widely utilized in the engine bearing industry, the composite material is tested in the form of a bearing in a hydraulic-bearing fatigue test machine, depicted in FIG. 7. The test bearing 73 is carried in a connecting rod 72 on an eccentric portion 71 of a shaft 70 which is rotating at an RPM typically seen by the bearing in actual use. On the other end of the connecting rod 72, there is a piston 74 in a hydraulic cylinder. Reciprocation of the connecting rod 72 and piston 74 is resisted by the oil in the hydraulic cylinder. The degree of resistance and the load on the bearing is determined by an adjustable valve 75 on the cylinder. The load is measured by a strain gage 76 on the connecting rod 72.

Testing begins at an arbitrary load selected by the researchers. The test is run for seven million cycles and the bearing is inspected for fatigue. If fatigue is present, the test is recorded as a failure and the next test is run at a lower load. If fatigue is not present, the test is recorded as a run out and the next test is run at a higher load. After multiple tests, the data is analyzed statistically and an average fatigue load is determined. Results of the test are shown in the tables below. Table 1 identifies two embodiments of the composite bearing material of the present invention. Table 1 includes the relative composition of the bearing material with the numbers following the elements indicating a weight percent of that element, as well as the interlayer thickness in microns, the interlayer type, the bonding method utilized to bond the alloy material to a steel backing, the bearing alloy microstructure, as well as the fatigue strength determined by the tests. For comparison, Table 2 identifies corresponding properties and characteristics of know prior bi-metal aluminum bearings.

TABLE 1

| Bearing Alloy Composition | Interlayer Thickness, Microns | Interlayer Type | Bonding Method | Alloy Micro-structure | Fatigue Strength, MPa | Conformability |
|---|---|---|---|---|---|---|
| Al Sn8 Si3 Pb2 Cu0.8 Cr0.2 | 100 | Pure Al | Hot | Fine | 100 | High |
| Al Sn6 Si4 CU0.8 | 100 | Pure Al | Hot | Fine | 100 | High |
| Al Sn12 Si3 Cu0.5 Cr0.2 | 100 | Pure Al | Cold | Fine | 80 | High |

TABLE 2

| Bearing Alloy Composition | Interlayer Thickness, Microns | Interlayer Type | Bonding Method | Alloy Micro-structure | Fatigue Strength, MPa | Conformability |
|---|---|---|---|---|---|---|
| Al Sn8 Si3 Pb2 Cu0.8 Cr0.2 | None | N/A | Hot | Fine | 74 | Medium |
| Al Sn12 Si3 Pb2 Mn0.2 Sb0.2 | 40–50 | "Reinforced" | Warm | Medium | 87 | Medium |
| Al Sn10 Si2 Pb1 Mn0.2 Sb0.2 | <20 | Nickel | Warm | Medium | 68 | Medium |
| Al Sn10 Ni2 Mn1 | 35 | Pure Al | Warm | Coarse | 76 | Medium |
| Al Sn11 Si3 Pb1 Cu0.9 Cr0.2 | <10 | Nickel | Warm | Medium | 78 | Medium |
| Al Sn10 Si3 Pb2 Cu0.9 Cr0.2 | 50 | Pure Al | Warm | Medium | 74 | Medium |
| Al Sn11 Si4 Cu1 | 50 | Pure Al | Warm | Coarse | 50 | Medium |
| Al Sn11 Si4 Cu2 | <10 | Nickel | Warm | Fine | 72 | Medium |
| Al Sn12 Si3 Pb2 Mn0.2 Sb0.2 | 40 | Pure Al | Warm | Medium | 75 | Medium |
| An Sn20 Cu1 | 40 | Pure Al | Cold | Coarse | 53 | High |
| Al Sn8 Si3 Pb2 Cu0.8 Cr0.2 | None | None | Hot | Coarse | 41 | Medium |
| Al Sn8 Si3 Pb2 Cu0.8 Cr0.2 | 75 | Pure Al | Hot | Coarse | 57 | Medium |

As can be seen from a comparison of the above tables, the composite bearing material of the invention has a fatigue strength of 80–100 mega pascals which exceeds that of all known prior art bi-metal aluminum materials with high conformability. Further, the hot and cold bonded material cited in Table 1 exhibits high conformability while maintaining high fatigue strength.

Obviously, many modifications and variations of the present invention are possible in light of the above teachings. It is, therefore, to be understood that within the scope of the appended claims, the invention may be practiced otherwise than as specifically described.

What is claimed is:

1. A sliding bearing, comprising:
   a steel backing; and
   a bi-metal lining bonded to said steel backing including a bearing layer of an aluminum-based alloy and an intermediate layer of essentially pure aluminum having a thickness of at least 60 microns.

2. The sliding bearing of claim 1, wherein said intermediate layer has a thickness of between about 60 and 120 microns.

3. The sliding bearing of claim 1 wherein said bi-metal lining is formed separately from said steel backing and is cold roll bonded thereto.

4. The sliding bearing of claim 3, wherein said steel backing and said intermediate layer have a combined cold rolled thickness that is about 40–50% of a combined thickness of said steel backing and said bi-metal lining prior to roll bonding.

5. The sliding bearing of claim 1, wherein said bearing layer has a composition expressed in weight percent of: 4–20% Sn, 1–6% Si, 0–2% of at least one element selected from the group consisting of Mn, Mg, Ni, Zr, Zn, Cu, and Cr, and the balance essentially Al and any incidental impurities.

6. The sliding bearing of claim 1, wherein said composition of said bearing layer comprises 12% Sn, 3% Si, 0.5% Cu, 0.2% Cr, and the balance essentially Al and any incidental impurities.

7. A method of manufacturing a composite bearing exhibiting good fatigue strength and high conformability, comprising:
   preparing a steel backing;
   preparing a bi-metal lining having a bearing layer of aluminum-based alloy material and an intermediate layer of essentially pure aluminum; and
   roll bonding the bi-metal lining and steel backing to bond them together and to yield a thickness of the intermediate layer of at least 60 microns.

8. The method of claim 7, wherein the steel backing strip and bi-metal lining are cold roll bonded.

9. The method of claim 8, wherein the backing strip and bi-metal lining are reduced in combined thickness by about 40–50% from their initial combined thickness following the cold roll bonding.

10. The method of claim 7, wherein the thickness of the intermediate layer is controlled to between 60 microns and 120 microns.

* * * * *